United States Patent
Rippel et al.

[15] 3,687,977
[45] Aug. 29, 1972

[54] THIOPHENE-3-ISONITRILES

[72] Inventors: Robert Rippel; Walter Dittmar, both of Hofheim/Taunus; Manfred Schorr, Frankfurt/Main, all of Germany

[73] Assignee: Farbwerke Hoechst Aktiengesellschaft, Frankfurt/Main, Germany

[22] Filed: Sept. 5, 1969

[21] Appl. No.: 855,726

[30] Foreign Application Priority Data

Sept. 23, 1968 Germany..........P 17 93 471.3

[52] U.S. Cl.......260/332.2 C, 260/329 F, 260/329 R, 260/329 S, 260/332.2 R, 260/332.3 R, 424/275
[51] Int. Cl.........................A61k 27/00, C07d 63/16
[58] Field of Search........260/329 R, 329 F, 332.2 R, 260/332.2 C, 332.3 R, 465 R

[56] References Cited

UNITED STATES PATENTS 3,422,190 1/1969 Ugi et al. ................... 424/226
3,102,841 9/1963 Vecchi et al. ................. 167/30

OTHER PUBLICATIONS

Smith, Open–Chain Nitrogen Compounds, Vol. I (Benjamin, N.Y., 1965), p. 228–229.
Ugi et al., (II) Angew. Chem. 77(1), p. 502 (1965).

*Primary Examiner*—Henry R. Jiles
*Attorney*—Curtis, Morris & Safford

[57] ABSTRACT

Thiophene-3-isonitriles of the formula

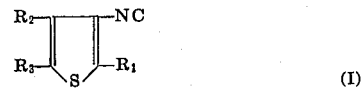

(I)

in which $R_1$ is hydrogen, alkyl, carbalkoxy, cyano or phenyl, $R_2$ is hydrogen, alkyl, alkoxy, carbalkoxy, cyano or phenyl, $R_3$ is hydrogen, alkyl, carbalkoxy or phenyl, or $R_2$ and $R_3$ together represent an alkylene chain, are disclosed as having antimycotic and antibacterial properties.

5 Claims, No Drawings

THIOPHENE-3-ISONITRILES

The present invention relates to thiophene-3-isonitriles of the general formula

in which
  $R_1$ is hydrogen, alkyl having one to six carbon atoms, carbalkoxy having one to four carbon atoms in the alkoxy group, cyano or phenyl,
  $R_2$ is hydrogen, alkyl or alkoxy having one to six carbon atoms, carbalkoxy having one to four carbon atoms in the alkoxy group, cyano or phenyl,
  $R_3$ is hydrogen, alkyl having one to six carbon atoms, carbalkoxy having one to four carbon atoms in the alkoxy group, or phenyl and
  $R_2$ and $R_3$ together represent alkylene having three to four ring members.

This invention relates furthermore to a process for the manufacture of the above specified compounds.

a. The compounds of the invention may be prepared by splitting off, in known manner, water from 3-formylaminothiophenes (N-thienylformamides) of the general formula II

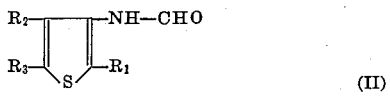

in which $R_1$, $R_2$ and $R_3$ have the meaning given above, or hydrogen sulfide from the corresponding thioformamides.

As compounds capable of splitting off water or hydrogen sulfide there may be used benzene- or toluenesulfochloride in the presence of anhydrous bases, for example pyridine or quinoline. Water may also be split off by means of phosphorus halides, phosphoroxy halides, phosphorus pentoxide, cyanochloride, cyanobromide, cyanuric acid chloride, generally acylating agents. Suitable bases are, for example, pyridine, potassium tert.-butylate or potassium carbonate. The reaction may also be carried out using phosgene in the presence of tertiary amines such as trimethylamine, triethylamine, tributylamine, N,N-dimethylcyclohexylamine, N,N-diethylamine, pyridine or quinoline. The reactions may be carried out in a homogeneous or heterogeneous phase. The solvents used for the manufacture in the homogeneous phase are inert organic solvents, such as hydrocarbons, halohydrocarbons, ethers, esters, and tertiary amines, for example petrol ether, benzene, methylene chloride, chloroform, tetrahydrofurane, ethyl acetate, mono- or dichlorobenzenes, triethylamine and pyridine. If the N-thienyl-formamidine is insoluble, the reaction may also be carried out in a heterogeneous phase by suspending the N-thienyl-formamide in one of the above-mentioned solvents and a base under vigorous stirring and introducing dropwise the compound splitting off water or passing it through the suspension in gaseous form.

The reactions are generally carried out at a temperature in the range of from $-20°$ to $+40°$ C. The product is worked up by adding ammonia or water, separating the organic solvent from the precipitated ammonium chloride or from the amine hydrochloride solution and, after elimination of the solvent by distillation, purifying the crude isonitrile by recrystallization, distillation or chromatography.

The N-thienyl-formamides used as starting materials may be prepared either by heating the corresponding aminothiophenes for 2 to 15 hours at $75° - 100°$ C with 2 to 10 times the amount of 85 to 100 percent formic acid, or by contacting the aminothiophenes with a mixture of formic acid and acetic acid anhydride at room temperature. The aminothiophenes may be obtained in known manner according to the processes disclosed in German Pat. Nos. 1,055,007, 1,088,507 and 1,083,830 or by the method of Cheney and Piening (J. Am. Chem. Soc. 67, p. 729, 731 (1945)).

b. The thiophene-3-isonitriles of formula I may also be prepared by reacting thienyl-3-amines with chloroform and strong bases in the manner known for analogous cases. The bases used may, for example, be ethanolic potassium hydroxide solution, solid alkali metal hydroxide or potassium tert.-butylate.

Thienyl-3-isonitriles may likewise be obtained c. by reducing corresponding thienyl-3-isocyanates with the aid of triethylphosphite, or d. by desulfurizing thienyl-3-isothiocyanates with tertiary phosphines, or e. finally by dehalogenating thienyl-3-isonitrilo-dihalides by means of tertiary phosphines.

As tertiary phosphines suitable for the above reactions there may be used, for example, triethyl-, tributyl-, triphenyl-, trichlorphenyl-, diethylbutyl- or diethylphenylphosphine.

Owing to their excellent antimycotic and antibacterial properties as well as their low toxicity, the products of the invention may be used in human and veterinary therapy for combating local bacterial and fungal infections. For example, dermatomycoses caused by skin fungi and budding fungi, such as trichophytone, microsporum and epidermophyte species as well as *Candida albicans*. Furthermore infections of the mucous membranes with fungi and mixed infections of the skin and the mucous membranes with said fungi and with bacteria, can successfully be treated with the compounds of the invention. The compounds may be administered in the form of solutions in lower alcohols (even as sprays), ointments, creams and powders which are locally applied to the skin. Suitable carrier materials for ointments and creams are, for example, usual galenic mixtures of polyglycols and vaseline; the powders preferably contain talcum as carrier material.

Depending on the degree of the infection, the skin ointments and creams contain the active ingredient in a concentration of from 0.25 to 1 percent, and the mucous membrane ointments in a concentration of from about 0.25 to 0.5 percent.

The following examples serve to illustrate the invention, but they are not intended to limit it thereto.

EXAMPLE 1 a. 3-isocyano-2-carbomethoxy-4-methylthiophene 9.9 g (0.1 mol) of phosgene were introduced at 0° C, while stirring, into a solution of 19.9 g (0.1 mol) of 3-formylamino-2-carbomethoxy-4-methyl-thiophene (m. p. 132° – 134° C, prepared from 3-amino-2-carbomethoxy-4-methyl-thiophene (m. p. 84° – 85° C) and formic acid) in 600 ml of methylene chloride and 50 ml of triethylamine. Stirring was continued for 1 hour at this temperature. The resulting solution was shaken twice with water, the organic phase was dried with sodium sulfate and, after distillation of the solvent, the solid residue was recrystallized from methylcyclohexane. Melting point 107° – 108° C.

In analogous manner there were obtained:

b. from 3-formylamino-2-carbomethoxy-thiophene (melting point 92° – 93° C) the 3-isocyano-2-carbomethoxy-thiophene (melting point 65° – 66° C);

c. from 3-formylamino-4-methyl-thiophene (melting point 113° – 114° C), the 3-isocyano-4-methyl-thiophene (boiling point 98° – 100° C under a pressure of 45 mm mercury);

d. from 3-formylamino-2-carbethoxy-4-methyl-thiophene (melting point 88° – 89° C), the 3-isocyano-2-carbethoxy-4-methyl-thiophene (melting point 76° – 77° C);

e. from 3-formylamino-2-carbo-n-propoxy-4-methyl-thiophene (melting point 81° – 82° C), the 3-isocyano-2-carbo-n-propoxy-4-methyl-thiophene (boiling point 90° – 92° C / 0.005 mmHg);

f. from 3-formylamino-2-carbomethoxy-5-methyl-thiophene (melting point 104° – 105° C), the 3-isocyano-2-carbomethoxy-5-methyl-thiophene (melting point 82° – 83° C);

g. from 3-formylamino-2-carbomethoxy-4,5-dimethyl-thiophene (melting point 123° – 124° C), the 3-isocyano-2-carbomethoxy-4,5-dimethylthiophene (melting point 84° – 85° C);

h. from 3-formylamino-2-carbomethoxy-4-ethyl-5-methylthiophene (melting point 116° – 117° C), the 3-isocyano-2-carbomethoxy-4-ethyl-5-methyl-thiophene (melting point 38° – 39° C);

i. from 3-formylamino-2-carbomethoxy-4,5-tetramethylenethiophene (melting point 121° – 122° C), the 3-isocyano-2-carbomethoxy-4,5-tetramethylene-thiophene (melting point 72° – 73° C);

k. from 3-formylamino-4-cyano-2-methyl-thiophene (melting point 122° – 123° C), the 3-isocyano-4-cyano-2-methylthiophene (melting point 107° – 108° C);

l. from 3-formylamino-4-carbomethoxy-2-methylthiophene (melting point 125° – 126° C), the 3-isocyano-4-carbomethoxy-2-methyl-thiophene (melting point 56° – 57° C);

m. from 3-formylamino-2-carbomethoxy-5-phenyl-thiophene (melting point 112° – 113° C), the 3-isocyano-2-carbomethoxy-5-phenyl-thiophene (melting point 125° – 126° C);

n. from 3-formylamino-2-carbomethoxy-4-phenyl-5-methylthiophene (melting point 122° – 124° C), the 3-isocyano-2-carbomethoxy-4-phenyl-5-methyl-thiophene (melting point 105° – 107° C).

EXAMPLE 2

3-isocyano-2-carbomethoxy-4-methylthiophene 19.9 g (0.1 mol) of 3-formylamino-2-carbomethoxy-4-methyl-thiophene were mixed with 26.4 g of p-toluene-sulfochloride and the mixture was introduced into 80 ml of pyridine under stirring. Within 20 minutes, an orange red solution formed which slowly turned dark green during 1 hour. The temperature rose to about 30° – 35° C. After 2 hours the solution was cooled and poured into 1 l of ice water. The mixture as extracted with ether, the ether solution was washed successively with 1N hydrochloric acid and twice with water, and finally dried with sodium sulfate. After evaporation of the ether the solid crude product was recrystallized from methylcyclohexane. Melting point 107° – 108° C.

The compounds mentioned in Example 1 were also prepared in a manner analogous to this Example 2.

EXAMPLE 3

3-isocyano-2-carbomethoxy-4-methyl-thiophene 10 g (0.05 mol) of 3-formylamino-2-carbomethoxy-4-methyl-thiophene were dissolved in 15 ml of pyridine and 75 ml of chloroform. 4.6 g of phosphoroxy chloride were added dropwise while stirring at 0° – 10° C. Stirring was continued for 1 hour at room temperature and then the solution was poured in 150 ml of ice water. The organic phase was separated, washed two times each with cold 1N hydrochloric acid and a sodium bicarbonate solution, and dried with sodium sulfate. After evaporation of the solvent the residue was recrystallized from methylcyclohexane. Melting point: 107° – 108° C.

EXAMPLE 4

3-isocyano-4-methyl-thiophene 25 g of finely ground potassium hydroxide, which had been molten previously, and 75 ml of benzene were refluxed under stirring. A mixture of 11.3 g (0.1 mol) of 3-amino-4-methyl-thiophene and 25 ml of chloroform was added in such a manner that the exothermic reaction kept the mixture slightly boiling. When the reaction was complete the mixture was refluxed for another 15 minutes and cooled. The precipitate was filtered and washed with a small amount of benzene. The combined benzene phases were washed successively with 5 percent-hydrochloric acid, 10 percent-sodium carbonate solution and water. After evaporation of the benzene, 3.5 g of 3-isocyano-4-methyl-thiophene were obtained; boiling point: 98° – 100° C/45 torr.

We claim:

1. Thiophene-3-isonitrile of the general formula I

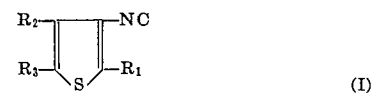

(I)

in which $R_1$ is hydrogen, alkyl having one to six carbon atoms, carbalkoxy having one to four carbon atoms in the alkoxy group, cyano or phenyl, $R_2$ is hydrogen, alkyl or alkoxy having one to six carbon atoms, carbalkoxy having one to four carbon atoms in the alkoxy group, cyano or phenyl, $R_3$ is hydrogen, alkyl having one to six carbon atoms, carbalkoxy having one to four carbon atoms in the alkoxy group, phenyl or $R_2$ and $R_3$ together are alkylene having three to four ring members.

2. The compound defined in claim 1 wherein $R_1$ is carbomethoxy, $R_2$ is methyl and $R_3$ is hydrogen.

3. The compound defined in claim 1 wherein $R_1$ is carbomethoxy and $R_2$ and $R_3$ together are tetramethylene.

4. The compound defined in claim 1 wherein $R_1$ is carbomethoxy, $R_2$ is methyl and $R_3$ is methyl.

5. The compound defined in claim 1 wherein $R_1$ is a carbomethoxy, $R_2$ is phenyl and $R_3$ is methyl.

* * * * *